United States Patent
Patel et al.

(10) Patent No.: US 9,361,368 B1
(45) Date of Patent: Jun. 7, 2016

(54) REVIEW-BROADCASTING INTEGRATING SOCIAL NETWORKS AND PRODUCT INFORMATION

(75) Inventors: Tilakkumar V. Patel, Redmond, WA (US); Gilberto Irias, Jr., Redmond, WA (US); Sonia Nagala Chang, Seattle, WA (US); Nathan B. Glissmeyer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 499 days.

(21) Appl. No.: 13/602,926

(22) Filed: Sep. 4, 2012

(51) Int. Cl.
*G06F 17/30* (2006.01)
*G06Q 50/00* (2012.01)

(52) U.S. Cl.
CPC .......... *G06F 17/30705* (2013.01); *G06Q 50/01* (2013.01)

(58) Field of Classification Search
CPC .................... G06F 17/30424; G06F 17/30705; H04L 51/32; H04L 65/40; H04L 67/306; G06Q 30/02
See application file for complete search history.

(56) References Cited

U.S. PATENT DOCUMENTS

| | | | |
|---|---|---|---|
| 9,020,957 B1 * | 4/2015 | Schneider | G06F 17/30705 707/749 |
| 2007/0112738 A1 * | 5/2007 | Livaditis | 707/3 |
| 2009/0240771 A1 * | 9/2009 | Capobianco | 709/204 |
| 2010/0125490 A1 * | 5/2010 | Kiciman | G06Q 30/0207 705/14.1 |
| 2011/0225178 A1 * | 9/2011 | Ingrassia | G06F 17/30038 707/769 |
| 2012/0300087 A1 * | 11/2012 | Shore et al. | 348/207.1 |
| 2013/0290333 A1 * | 10/2013 | Fraczak et al. | 707/737 |

* cited by examiner

*Primary Examiner* — Dinku Gebresenbet
(74) *Attorney, Agent, or Firm* — Lowenstein Sandler LLP

(57) ABSTRACT

A feedback module identifies one or more social network data entries received from the at least one social network provider that are related to a content item. The feedback module parses the identified one or more social network data entries to identify feedback related to the content item. The feedback module then generates a feedback result based on the feedback identified in the one or more social network data entries.

20 Claims, 8 Drawing Sheets

REVIEW-BROADCASTING INTEGRATING SOCIAL NETWORKS AND PRODUCT INFORMATION

BACKGROUND OF THE INVENTION

A large and growing population of users enjoy entertainment through the consumption of media items. Often times, these media items are purchased via the Internet from websites of content providers. As part of an online purchase experience presented to a consumer, a content provider may present a web page including details regarding a content item provided by the content provide. The details may include a title, description, and price of the item. In addition, reviews and recommendations associated with the item may be presented.

It is increasingly common for consumers to demand up-to-date and accurate feedback information regarding content items that may potentially be purchased by the customer. A consumer is more likely to be a repeat customer to a content provider's website if the website can provide feedback and reviews that are relevant to the consumer. However, it can be problematic to meet this level of demand associated with feedback data.

One problem is that it is difficult for a content provider to obtain reviews from all previous consumers of a product, resulting in a partial feedback set that may be skewed to a certain type of consumer (e.g., an unhappy consumer). Another problem is that it is difficult to cull from the entire set of provided reviews to present the particular reviews that are relevant to an individual consumer. For example, a consumer that is a parent may be interested in just those reviews provided from other parents with a similar "experience" as the purchasing parent (e.g., similar location, ages of children, level of education, etc.). However, such social mapping of experiences of consumers cannot be easily obtained or filtered by the website.

BRIEF DESCRIPTION OF THE DRAWINGS

Embodiments of the invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

Embodiments of a method and apparatus are described for a reviews-broadcasting mechanism integrating social networks and product information. In one embodiment, a reviews broadcasting mechanism of a content provider identifies one or more social network data entries received from at least one social network provider that are related to a content item. A content item may be, for example, books, music, movies, TV shows, CDs, DVDs, games, and so on, either in a physical form or an electronic format. Social network entries may be, for example, status updates, twitter feeds, postings on a profile page of the social network, etc.

The reviews broadcasting mechanism parses the identified social network data entries to identify feedback information associated with the content item. For example, the social network data entries may be mined for age-based review information, content-type review information, and/or other situational-based information. The customized feedback module generates a single feedback result based on the feedback information identified in the social network data entries. The aggregated feedback result may be, for example, a most-recommended age by reviewers of a product, a most prevalent content-type rating for the product, and so on.

In another embodiment, a customized feedback module of a reviews broadcasting mechanism receives social network data entries from a social network provider and parses the social network data entries to identify one or more of the social network data entries that are related to a content item. The customized feedback module also parses the identified social network data entries to identify feedback information within the entries and adds the identified feedback as a record in a feedback table. Furthermore, the customized feedback module receives an indication from a user to view only feedback from members of a social circle of the user. The customized feedback module then generates a feedback result from the records in the feedback table that are associated with the members of the social circle of the user and presents the feedback result to the user.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Figure 1:
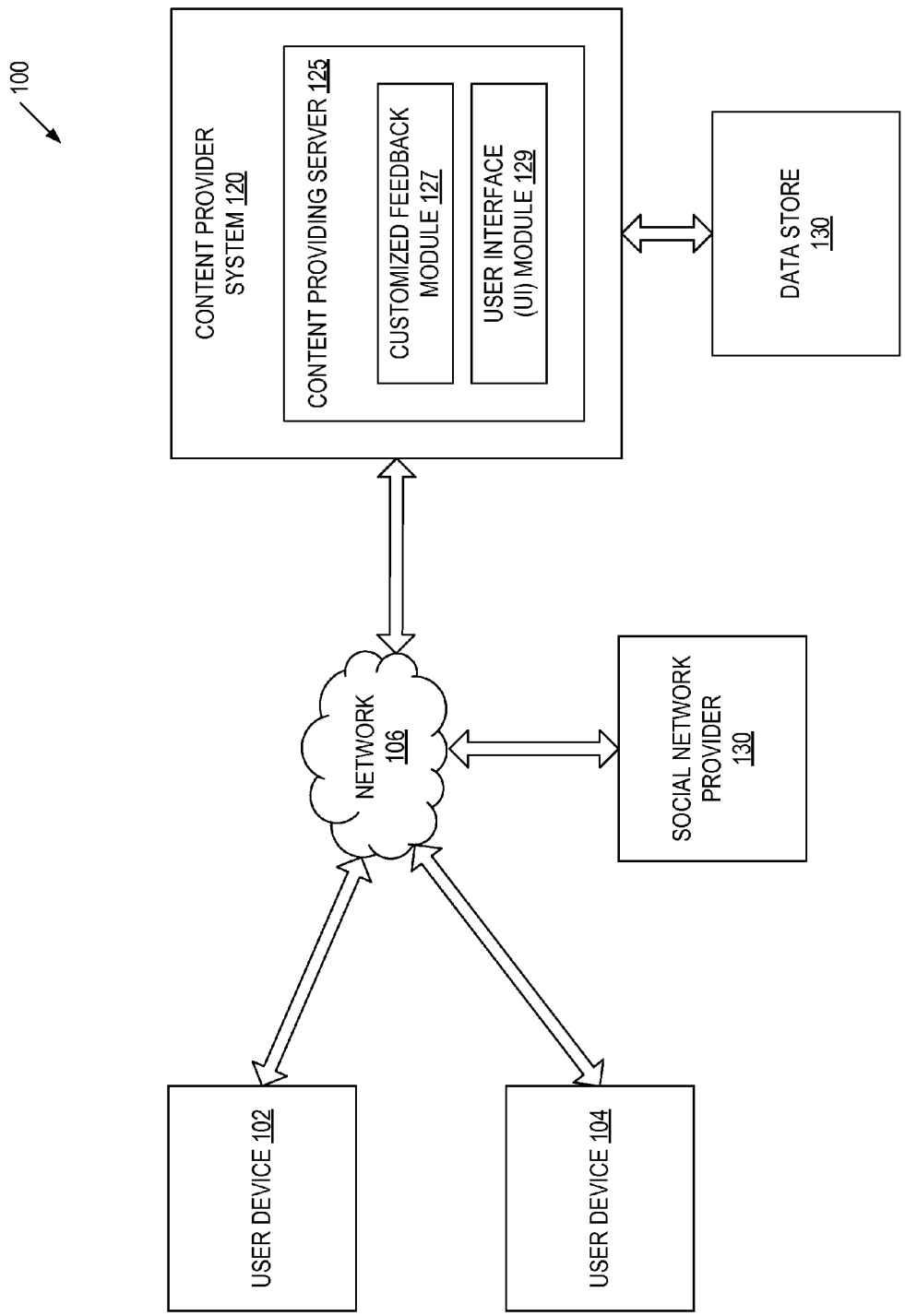
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include laptops, cellular telephones, personal digital assistants (PDAs), portable media players, netbooks, and the like. The user devices 102, 104 may also be non-portable computing devices such as a desktop computer, a set-top box associated with a television, a gaming console, and so on.

In one embodiment, the user devices 102, 104 are variously configured with different features to enable consumption of one or more types of digital content and electronic media items. Furthermore, user devices 102, 104 may include a web browser application (not shown) to enable the purchase of content items (physical content items or electronic content items) from a content provider. For example, the web browser application may enable a user of user device 102, 104 to visit a web site of a content provider to purchase (or rent or obtain via mutual agreement) content items from the content provider. The obtained content items may then be provided to the user via mail or electronic delivery, depending on the type of obtained content.

In some embodiments, the content provider system 120 may correspond to any feature or combination of features for providing media items (electronic or physical) or other digital content to the user devices 102, 104. The content provider system 120 may include a network-accessible server-based functionality (content providing server 125), various data stores 130, and/or other data processing equipment. In some embodiments, the content provider system 120 acts as a purchasing intermediary for providing physical versions of media items (e.g., books, CDs, DVDs, game cartridges, etc.) via mail delivery. The content provider system 120 may be implemented by a single machine or a cluster of machines. The content provider system 120 may include one or more machines (e.g., one or more server computer systems, routers, gateways, etc.) that have processing and storage capabilities to provide the server-based functionality.

In one embodiment, the content providing server 125 corresponds to an entity which provides a plethora of various types of content items (e.g., books, music, movies, TV shows, CDs, DVDs, games, and so on). In another embodiment, the content providing server 125 corresponds to an entity that provides electronic content items (e.g., electronic books, digital music, digital movies, etc.) to users upon the users' purchase of the items. In this role, the content providing server 125 may essentially act as a bookseller or the like. In yet other embodiments, the content providing server 125 corresponds to an entity which provides electronic content items to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The content providing server 125 may deliver, and the user devices 102, 104 receive, electronic publications (or other media items), search results, upgrades, and/or other information via the network 106. For example, the user devices 102, 104 may download or receive ebooks from the content providing server 125. The content providing server 125 may also receive various requests (e.g., search queries), instructions and other data from the user devices 102, 104 via the network 106.

Communication between the user devices 102, 104 and the content provider system 120 may be enabled via any communication infrastructure. One example of such an infrastructure includes a combination of a wide area network (WAN) and wireless infrastructure, which allows a user to use the user devices 102, 104 to purchase digital content (e.g., electronic publications) and consume the digital content without being tethered to the content provider system 120 via hardwired links. The wireless infrastructure may be provided by one or more multiple wireless communications systems. In one embodiment, the wireless communication system may be a wireless fidelity (WiFi) hotspot connected with the network 106. Wireless communication system may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system that serves as an intermediary in passing information between the content provider system 120 and the wireless communication system. The communication-enabling system may communicate with the wireless communication system (e.g., a wireless carrier) via a dedicated channel, and may communicate with the content provider system 120 via a non-dedicated communication mechanism, (e.g., a public Wide Area Network (WAN) such as the Internet).

In addition to wirelessly connecting to wireless communication system, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, content providing server 125 may include customized feedback module 127. Customized feedback module 127 may generate and broadcast customized feedback results associated with a content item viewed by a user of user device 102, 104. In one embodiment, customized feedback module 127 interacts with a social network provider 130 to generate the customized feedback results.

Social network provider 130 may provide a social network service for a plurality of end users. A social networking service may be an online service, platform, or site that focuses on facilitating the building of social networks or social relations among people who, for example, share interests, activities, backgrounds, or real-life connections. A social network often includes a representation of each user (often a profile), his/her social links, and a variety of additional services (e.g., email and instant messaging). In one embodiment, the social network is provided by a same organization providing the content item.

Many social networks are web-based and provide means for users to interact over the Internet, such as e-mail and instant messaging. Types of social networks may include, but are not limited to, those that contain category places (such as former school year or classmates), means to connect with friends (usually with self-description pages), a recommendation system linked to trust, and a blogging platform that is customizable to following particular users. Some social networks are a combination of one or more of the above types.

In one embodiment, customized feedback module 127 polls the social network provider 130 for data in order to mine feedback information from that data. The feedback information may be related to one or more content items provided by the content provider system 120. For example, the feedback information may be a user's discussion of a book, movie, music, or other product sold by a content provider. This discussion may include a user's recommendation of the product and, for example, a suggested appropriate age of a user of the product. In another example, the user's recommendation may include terms such as "violence" or "profanity" that relate to a content-based review of the product.

In some embodiments, the social network provider 130 provides a streaming application programming interface (API) that allows the content provider system 120 to receive and/or monitor a continuous stream of social network data from the social network provider 130. The social network data may include status updates, tweets, and other posts made by users of the social network provider 130. In one embodiment, the customized feedback module 127 and/or the social network provider 130 notify users of the types of information that may be stored, transmitted, and/or utilized by the customized feedback module 127 and the social network provider 130, and provides the user the opportunity to opt-out of having such information stored and/or accessible by and/or shared with the customizable feedback module 127 and/or social network provider 130.

The customized feedback module 127 may be programmed with search terms that are used to identify and aggregate product feedback provided by social network users using the social network provider 130. The search terms may be used to identify feedback for a particular product shared by users of the social network provider 130. In one embodiment, the search terms include, but are not limited to, a unique hashtag associated with the content provider system 120, a product identification (ID) number (e.g., International Standard Book Number (ISBN) or other Standard Identification Number), and a title/name of the product.

For example, in one embodiment, a unique hashtag may be associated with products, or a subset of products, of the content provider system 120. A hashtag is a word or phrase that may be prefixed with the symbol '#' to form a metadata tag that identifies groups and/or topics. When a social network user adds this hashtag to their social network message (e.g., status update, tweet, etc.), the hashtag then identifies the information in the message as associated with the content provider system 120, or in some cases, a subset of products of the content provider system 120. In addition, a product ID number and/or title may be used to identify a particular product of the content provider system 120 discussed in the social network data provided by the social network provider 130. In some embodiments, the unique hashtag does not have to be included in the social network data in order to identify the data as associated with a particular product. As such, the product ID information alone may be utilized to identify product-relevant social network data entries.

In one embodiment, the social network data stream from the social network provider 130 is searched for the unique hashtag and product ID information, and any entries that may be relevant to feedback for a product of the content provider system 10 are identified. These identified social network data entries may then be mined by the customized feedback module 127 for information that is relevant to the feedback, such as a recommended age for a product, a content type of the product, situational information of the product (e.g., helpful for a child in $3^{rd}$ grade math), trends of the product (e.g., popularity, emerging trend), and so on.

In one embodiment, the information relevant to the feedback can then be aggregated together to provide a consensus review for the product. For example, age recommendations provided via social network provider for a product can be aggregated and an age identified by a predetermined percentage of the social network data entries determined. This aggregated feedback result may then be displayed as the "most-recommended" age for the product on a product page website associated with the product.

In one embodiment, the aggregated feedback result may be further customized to only include identified feedback from social network users that are a part of a social circle of the user. The social circle may refer to individuals indicated as one or more of known, trusted, or followed by the user that is viewing the product. Constructs of a social circle may differ between various social network providers 130. This allows users to view feedback that is limited to individuals that the user has indicated they trust.

In some embodiments of the invention, the content providing server 125 also includes a user interface (UI) module 129 configured to generate a widget to display the customized feedback generated by customized feedback module 127 on the product web page. A widget may refer to a graphical user interface (GUI) that displays an information arrangement changeable by the user, such as a window or a text box. The widget provides a single interaction point for the direct manipulation of a given kind of data.

In other embodiments, the UI module 129 may also provide a survey form in the widget. The survey form may allow a user to submit product feedback from the product details web page directly to a platform of the social network provider 130 of the user. As a result, a user may share their feedback on the product web page and with their social circle on the social network provider 130. In some embodiments, the widget of the UI module 129 is continuously updated with a product's latest feedback identified by the customized feedback module 127 using the social network provider 130 data entries.

In some embodiments, product feedback data may be provided free-form from devices such as mobile phones. A Short Message Service (SMS) or other simple interface may be utilized to provide structured data that can be parsed and matched as described above. In such an embodiment, the delivery of these free-form messages is supported by a gateway device or a cellular carrier.

Some embodiments of the customized feedback module 127 and UI module 129 are described in greater detail below with reference to FIGS. 2-7.

Figure 2:
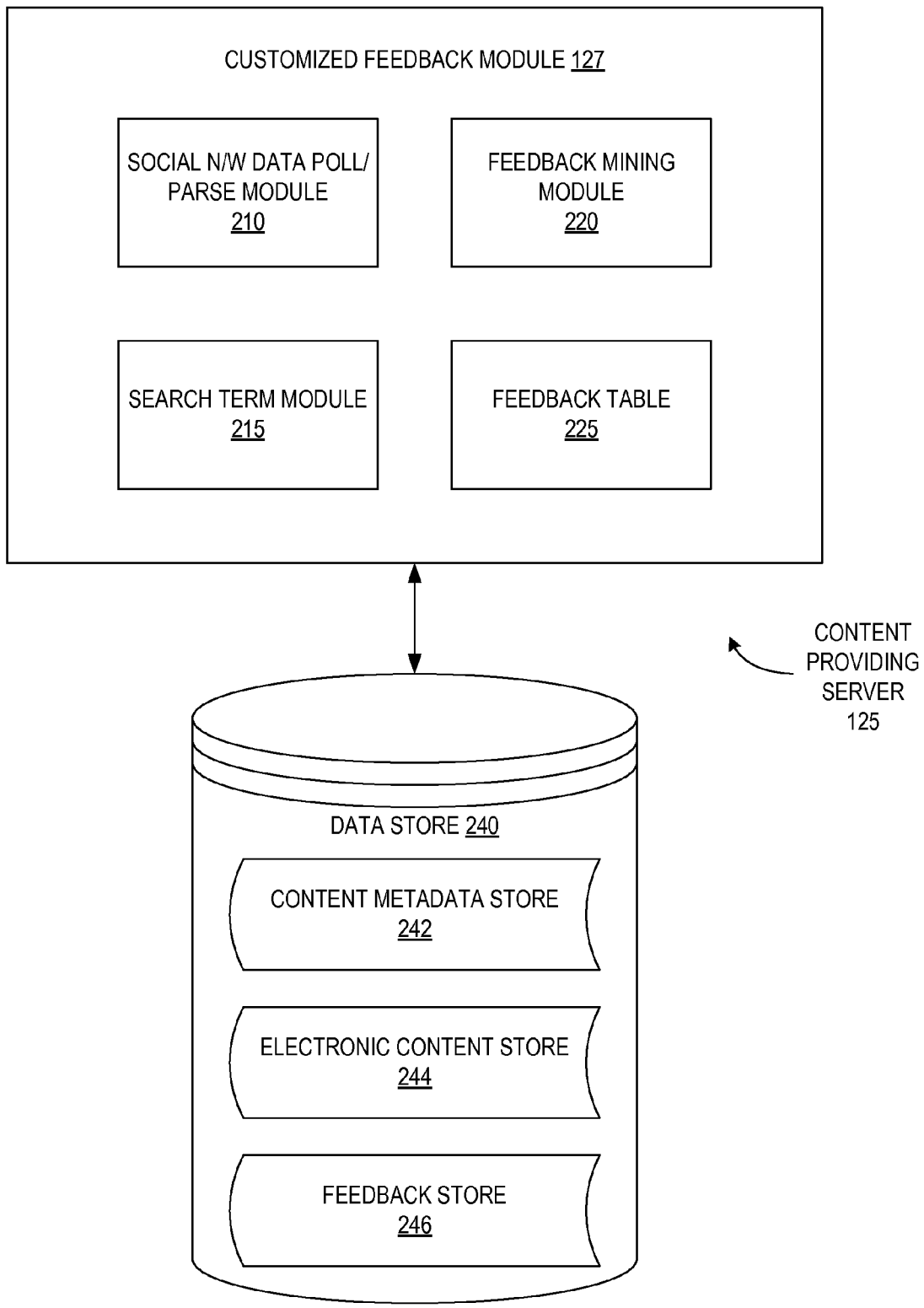
FIG. 2 is a block diagram illustrating a customized feedback module, according to an embodiment.

FIG. 2 is a block diagram of one embodiment of a customized feedback module 127 that may be included in a server, which may correspond to content providing server 125 of FIG. 1. In one embodiment, content providing server 125 includes customized feedback module 127, which may include social network data poll/parse module 210, search term module 215, feedback mining module 220, and feedback table 225. In one embodiment, customized feedback module 127 is connected to one or more data stores 240, which may be a file system, database or other data management layer resident on one or more data storage devices such as a disk drive, RAM, ROM, etc. Data store(s) 240 may include content metadata store 242, electronic content store 244, and feedback store 246, which may be represented as a single data structure or multiple data structures.

Content metadata store 242 may contain information about each electronic media item that is offered by content providing server 125 to the users of user devices 102, 104. Content metadata store 242 may contain bibliographic information about each item such as author, title, identifier (e.g., International Standard Book Number (ISBN), Standard Identification Number), publisher, publication date (physical copy and electronic copy), length, etc. Content metadata store 242 may also include other information about each item, such as price, readability information (e.g., Automated Readbility Index, Flesch Kincaid Reading Ease, Flesch Kincaid Grade Level, Gunning Fox Index), language, topics, abstract, etc. Content metadata store 242 may also include a popularity classification (e.g., a glance view (GV) status) indicative of the popularity of an electronic media item.

Electronic content store 244 may store copies of electronic media and/or digital content items that are available (e.g., immediately) for transmission to a user device 102, 104 upon purchase (or rental or other agreement) from the content providing system 120. The electronic media items and digital content may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content.

Feedback store 246 may store copies of parsed social network data that has been identified as relevant feedback. In one embodiment, the feedback store 246 may be a NoSQL database using a key-value storage model.

Referring back to customized feedback module 127, the social network data poll/parse module 210 of the customized feedback module 127 may connect to one or more APIs provided by one or more social network providers in order to poll and/or search for data from the one or more social network providers. In one embodiment, the API from a social network provider may include a streaming API that maintains a state of the communication connection between the social network provider and the content provider system, so that just new information is passed to the content provider system.

Upon receipt of new social network data, social network poll/parse module 210 may parse the data using search terms provided from search term module 215 to identify social network data entries related to a content item of content provider system. Search term module 215 may be programmed by an administrator with various search terms used to identify the potentially relevant social network data entries. As previously discussed, the search terms may include, but are not limited to, a unique hashtag associated with the content provider system 120, a product identification (ID) number (e.g., International Standard Book Number (ISBN)) of a content item, and/or a title/name of a content item. In one embodiment, one or more of the search terms may be obtained from the content metadata store 242.

In one embodiment, when social network data entries are identified as related to a content item by social network poll/parse module 210, the feedback mining module 220 mines these identified entries for feedback information. In one embodiment, the feedback mining module 220 is programmed by an administrator of the content provider system 120 to search for a particular type of feedback. Types of feedback may include, but are not limited to, age-based reviews, content type reviews (e.g., violence, profanity, etc.), trends-based reviews (e.g., popularity, emerging trends, etc.), situational reviews (e.g., helpful for $3^{rd}$ grade math, etc.), product integration-based reviews (e.g., works/does not work with certain devices), product life span reviews (e.g., lasted 6+ months, etc.), and so on.

The feedback mining module 220 may use search terms, such as a regular expression of age, to identify the specific feedback type information that may be provided in the identified social network data entries. For products where an attribute of the product is most important (e.g., fragrance for perfumes), social network data can be aggregated around that particular attribute and feedback related to that attributed parsed from the social network data. The following examples provide details of specific use cases of collecting feedback for particular product types.

In a first example for luggage bag products, often dimensions are mentioned but there are no references to how well the bag may fit in a travel compartment (e.g., overhead bin in an aircraft). In some cases, the dimensions are not wholly accurate, because, for example, wheels might not be included while measuring dimensions. Therefore, the customer feedback information relaying real-world use examples of the bag's dimensions is informative for feedback purposes In another example for cameras lens products, customer feedback for the product may focus on whether the camera lens should be owned as a primary lens or a secondary lens. In this case, there is no negative side to the feedback; instead, the feedback just provides a number to boost confidence in buying the product. This type of feedback is similar to measuring/aggregating positive recommendations.

In an additional example for MP3 (MPEG-1 or MPEG-2 Audio Layer III) digital audio products, there are some songs that are very popular and have multiple versions (e.g., regular (non-filtered) version and filtered version). The feedback for an MP3 product can relate to profane words in the song, so that customer feedback indicating that a high percentage of the customers would rather buy the filtered version of the song indicates that the MP3 product is high in profanity.

After the feedback mining module 220 has mined feedback data from the identified social network data entries, this data is added to the feedback table 225 that stores of the mined feedback data for the customized feedback module 127. The feedback table 225 maintains an ongoing collection of reviews culled from received social network data in a table format. Each entry in the feedback table 225 may include information such as the product ID, the user providing the feedback, date of feedback, a type of the feedback, the feedback-specific data, and so on.

In some embodiments, the feedback mining module 220 may also filter the mined feedback to view just social network data originating from members of a user's social circle. In one embodiment, a social circle is specific to constructs of the particular social network provider and may include individuals a user follows, individual that a user has indicated they trust, and so on. This type of filtering allows a user to view feedback that originates from individuals that the user has agreed to connect with. In some embodiments, such a filter may provide more relevant, or at the least a different kind of, feedback that is consistent with a background and/or experience of the user accessing the feedback. In one embodiment, the customized feedback module 127 may utilize social network log-in information provided by the user, as well as information provided by the social network provider, to identify the social network data entries from individuals that are part of the user's social circle. One skilled in the art will appreciate that customizable privacy policies may be implemented to allow a user to control how data associated with the user is used and/or obtained.

In one embodiment, the feedback mining module 220 utilizes the collection of information to generate an aggregated feedback result for a content item. For example, for an age-based review, the feedback mining module 220 may determine an age that is suggested by at least 70% of the reviewers (social network users). This determined age is then provided to the UI module for display on the product web page. As another example, for a content type-based review, social network users may rate violence on a scale of 1 to 5 in terms of increasing violence. The feedback mining module may then determine the average number (from 1-5) from all the identified feedback entries, and provide this average as the violence rating to be displayed on the product information page by the UI module. One skilled in the art will appreciate that a variety of aggregation algorithms may be utilized to generate an aggregated feedback results, and that embodiments of the invention are not limited solely to the above-described examples.

In one embodiment, the aggregated feedback result is stored in the feedback store 246. In addition, the aggregated feedback result may be supplied to a UI module, such as UI module 129 of FIG. 1, to present in a feedback widget on a product information web page associated with the corresponding content item. One skilled in the art will appreciate that the aggregated feedback result may be utilized for more than a product information webpage. For instance, the aggregated feedback may be provided as one of potentially many inputs into parental control logic implemented by a user device, such as user device 102, 104 of FIG. 1. In other embodiments, the aggregated feedback may be utilized in a customizable buying guide, as part of a search results filter, for merchandizing, and so on.

Some embodiments of customized feedback module 127 are further discussed below with respect to FIGS. 3 and 4.

Figure 3:
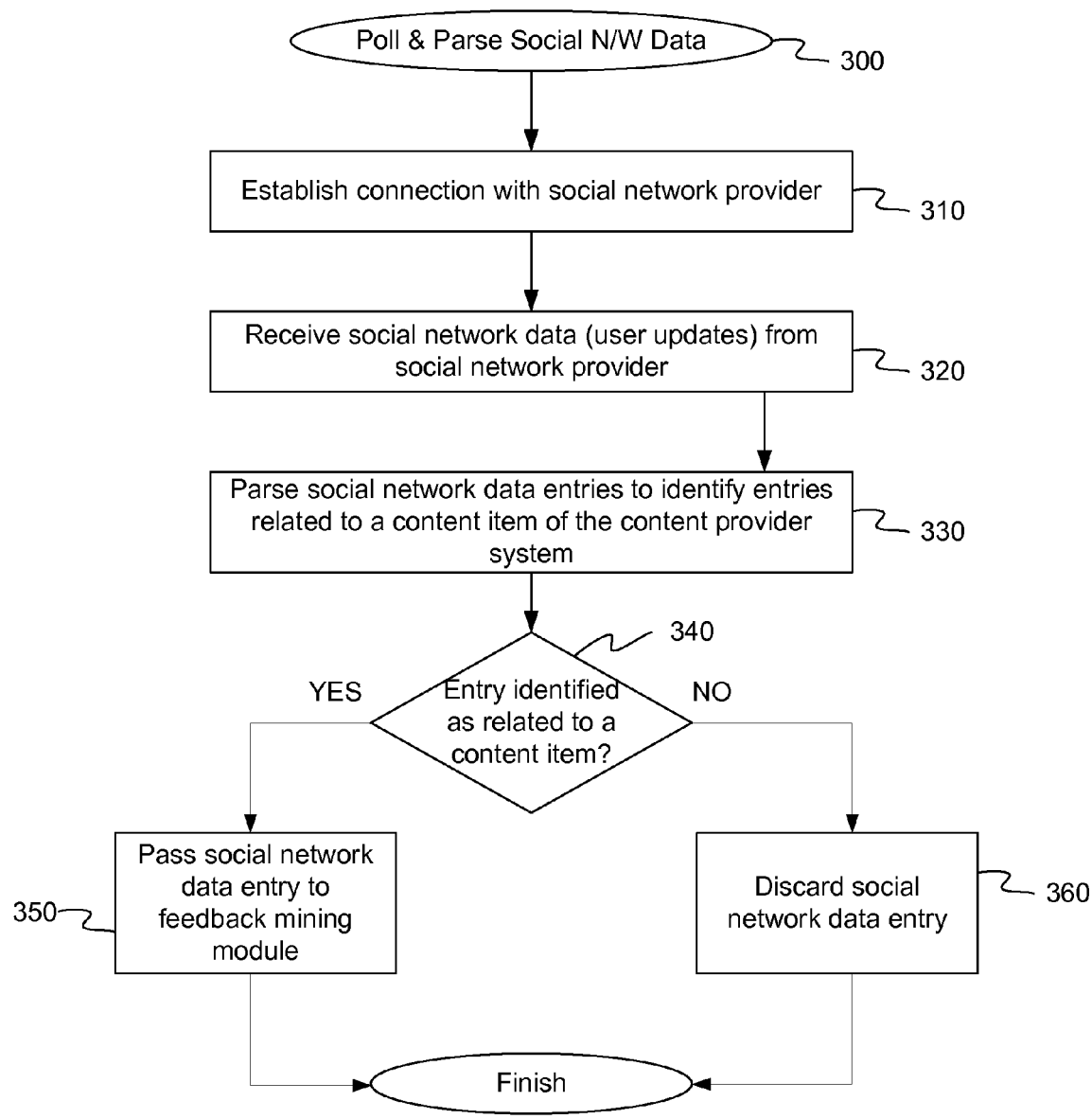
FIG. 3 is a flow diagram illustrating a method to poll and parse social network data, according to an embodiment.

FIG. 3 is a flow diagram illustrating a method 300 to poll and parse social network data, according to an embodiment. The method 300 may be performed by processing logic that comprises hardware (e.g., circuitry, dedicated logic, programmable logic, microcode, etc.), software (e.g., instructions run on a processor to perform hardware simulation), or a combination thereof. In one embodiment, method 300 may be performed by customized feedback module 127, and in particular a social network parse/poll module 210, as shown in FIGS. 1 and 2.

Referring to FIG. 3, at block 310, method 300 establishes a connection with a social network provider. In one embodiment, the connection is established via a streaming API provided by the social network provider. The streaming API provides continuously updated social network data, including, for example, user status updates, twitter feeds, and so on. At block 320, social network data is received from the social network provider via the established connection.

At block 330, the received social network data is parsed to identify entries related to a content item of the content provider. In one embodiment, at least one of a unique hashtag associated with the content provider, a product ID number, and/or a product title/name are searched for within the received social network data entries. In some embodiments, a combination of the unique hashtag and one or both of the product ID and product title/name are used to identify an entry as related to a content item. In another embodiment, the hashtag is not used as a search term to identify a data entry as related to a content item.

At decision block 340, it is determined whether any of the social network data entries are identified as related to a content item of the content provider. If so, then the identified social network data entries indicated as related to a content item are passed to a feedback mining module at block 350. Some embodiments of operations performed by the feedback mining module are described below with respect to FIG. 4. On the other hand, if an entry is not identified as related to a content item of the content provider at decision block 340, then the entry is discarded at block 360.

Figure 4:
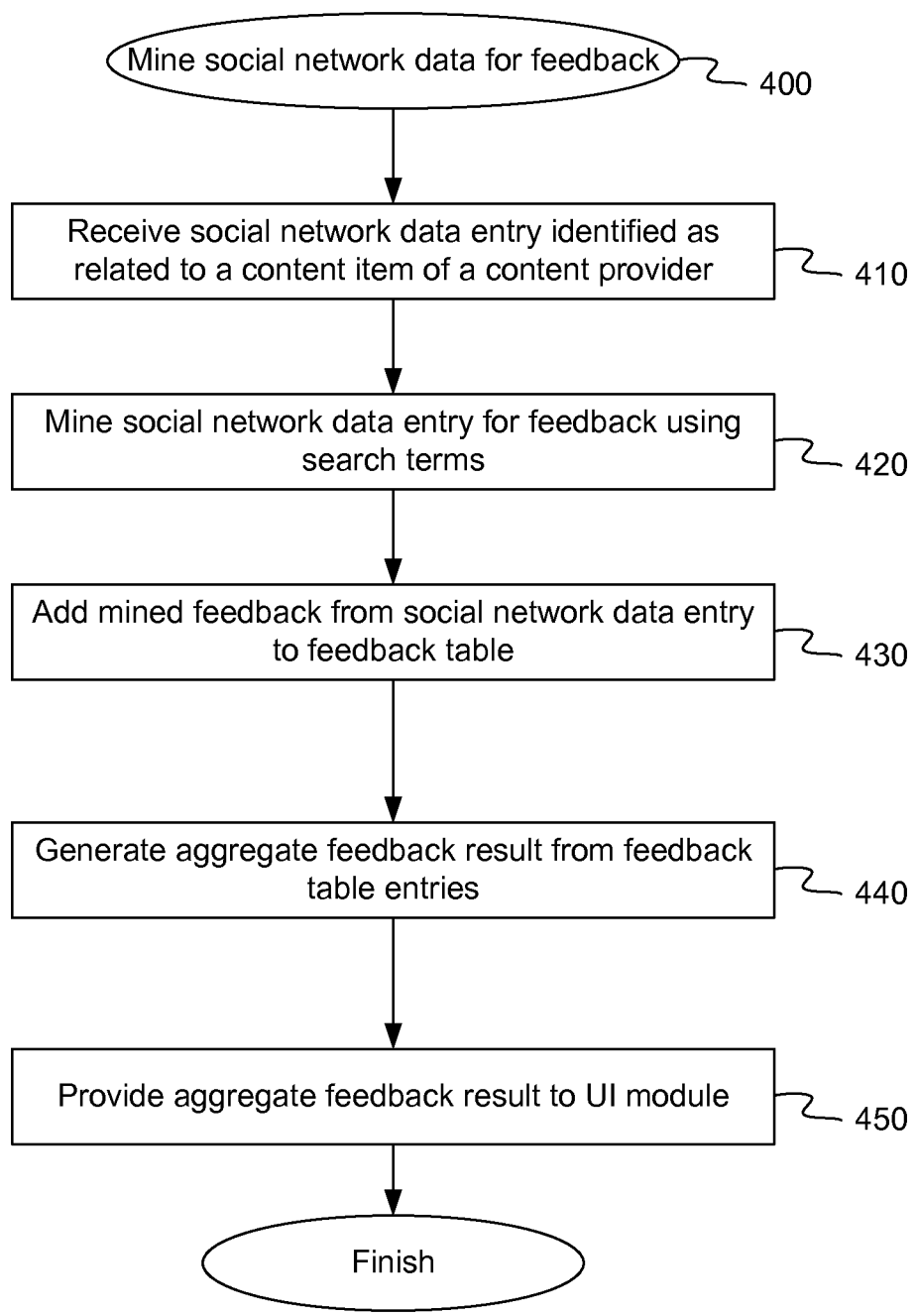
FIG. 4 is a flow diagram illustrating a method to mine social network data for feedback, according to an embodiment.

FIG. 4 is a flow diagram illustrating a method 400 to mine social network data for feedback, according to an embodiment. In one embodiment, method 400 may be performed by customized feedback module 127, and in particular a feedback mining module 220, as shown in FIGS. 1 and 2.

Referring to FIG. 4, at block 410, method 400 receives a social network data entry identified as related to a content item of a content provider. In one embodiment, the social network data entry is passed to the feedback mining module from a social network poll/parse module of the customized feedback module. At block 420, the received social network data entry is mined for feedback. In one embodiment, the social network data entry is searched for pre-determined terms related to a specific feedback-type search. Feedback-type searches may include, but are not limited to, age-based reviews, content type reviews (e.g., violence, profanity, etc.), trends-based reviews (e.g., popularity, emerging trends, etc.), situational reviews (e.g., helpful for $3^{rd}$ grade math, etc.), product integration-based reviews (e.g., works/does not work with certain devices), and so on.

At block 430, any feedback information mined from the social network data entry is added to a feedback table maintained by the customized feedback module. Then, at block 440, an aggregate feedback result is generated from the entries in the feedback table. In one embodiment, the aggregated feedback process fetches all entries in the feedback table related to a content item and uses feedback-type information from the fetched entries to generate the aggregated feedback result. For example, as described above, one aggregated feedback result may use an age amount that is listed in at least 70% of the feedback entries for a content item in the feedback table.

Lastly, at block 450, the aggregated feedback result is provided to a UI module of the customized feedback module for further use by the content provider. In some embodiments, the UI module may use the aggregated feedback result for display in a widget on a product details web page of the content item (see, e.g., FIG. 5 described below), as part of a customized buying guide for a user, a part of a search results filter offered by the content provider, as feedback for parental control logic offered by the content provider, for merchandizing purposes of the content provider, or to provide information back to a manufacturer of a product to help them determine how to market or describe their offering based on usage data by a test group, to name a few examples.

Figure 5:
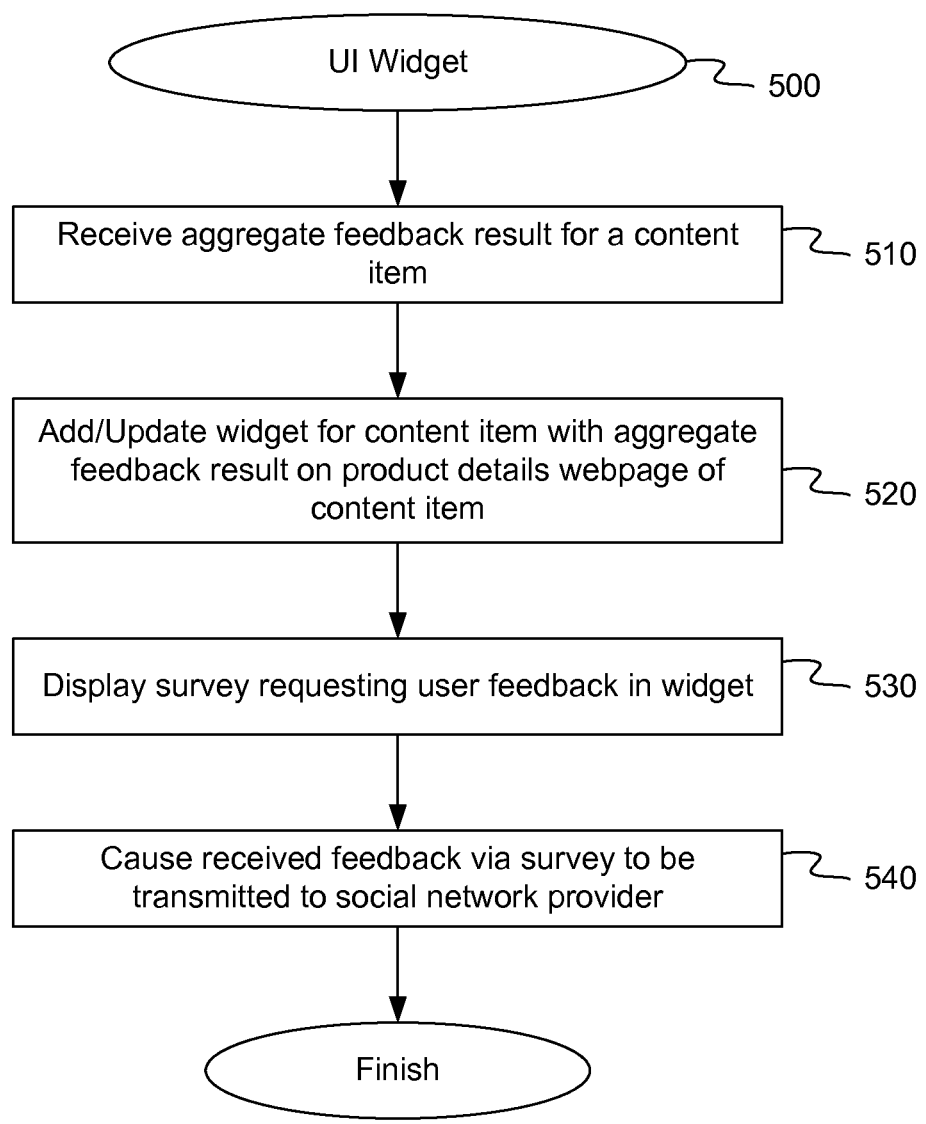
FIG. 5 is a flow diagram illustrating a method to present feedback information mined from social network data to a user of a content provider system, according to an embodiment.

FIG. 5 is a flow diagram illustrating a method 500 to present feedback information mined from social network data to a user of a content provider system, according to an embodiment. In one embodiment, method 500 may be performed by customized feedback module 127, and in particular a UI module 129, as shown in FIGS. 1 and 2.

Referring to FIG. 5, at block 510, method 500 receives an aggregate feedback result for a content item. In one embodiment, the aggregated feedback result is generated using methods 300 and 400 of FIGS. 3 and 4 described above. In another embodiment, a feedback mining module of the customized feedback module provides the aggregate feedback result to the UI module.

Figure 6:
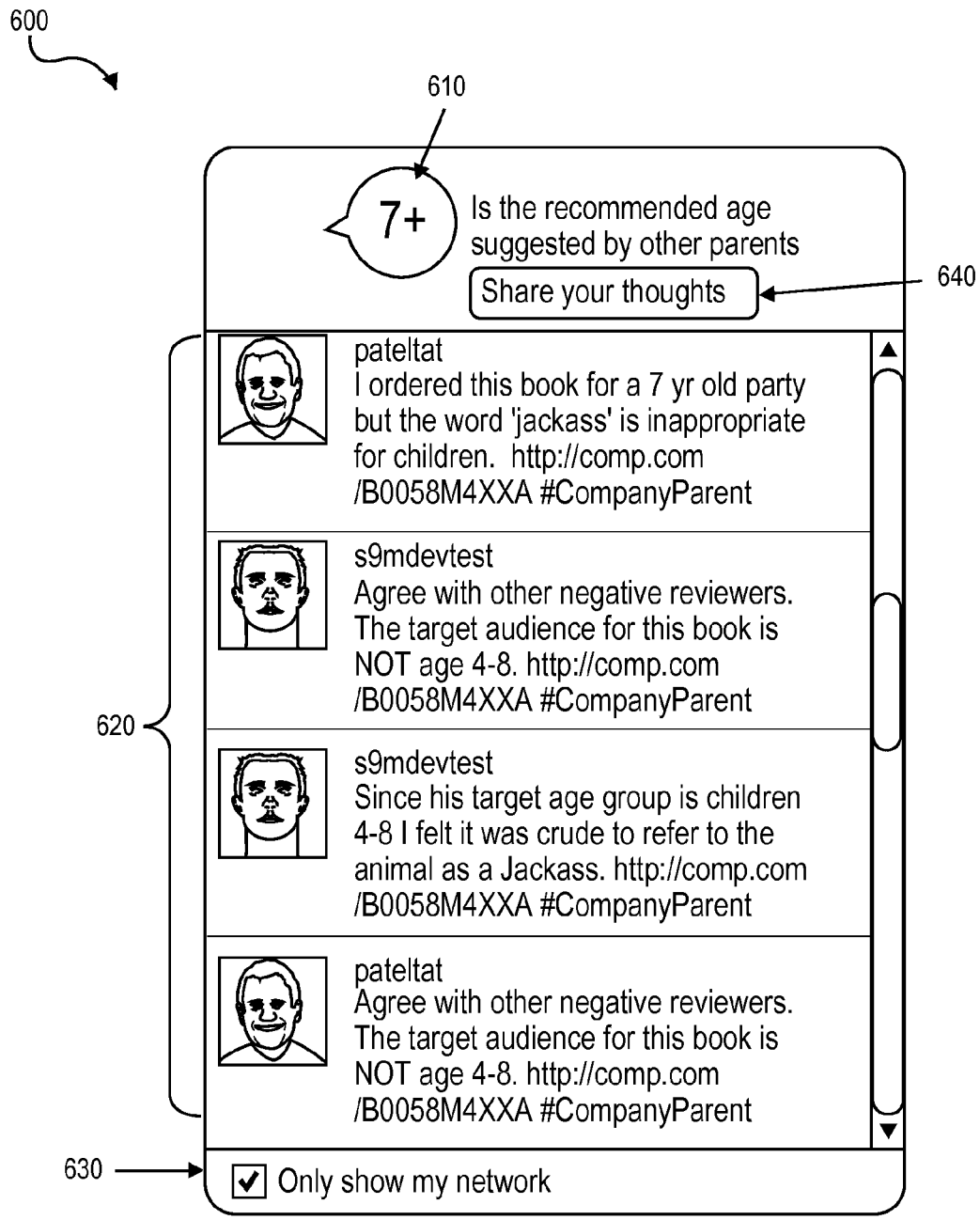
FIG. 6 is a screenshot depicting an embodiment of a widget that may be displayed on a product details web page for a content item.

Then, at block 520, a widget associated with the content item is one of added or updated with the aggregate feedback result on a product details webpage of the content item. FIG. 6 is a screenshot 600 depicting one embodiment of a widget that may be displayed on a product details web page for a content item. Any social network provider may be integrated with widget 600.

Widget 600 includes an age-based aggregated feedback result 610. In addition, widget 600 includes an aggregated feedback comments area 620 that displays all of the social network data entries that were identified and used to generate the aggregated feedback result 610. In one embodiment, a radio button 630 may be selected to allow a user to view feedback from only members of the user's social circle. In yet another embodiment, the widget 600 includes a feedback button 640 that, when selected, generates another UI (one embodiment detailed in FIG. 7) allowing the user to share feedback about the content item associated with the product details web page.

Figure 7:
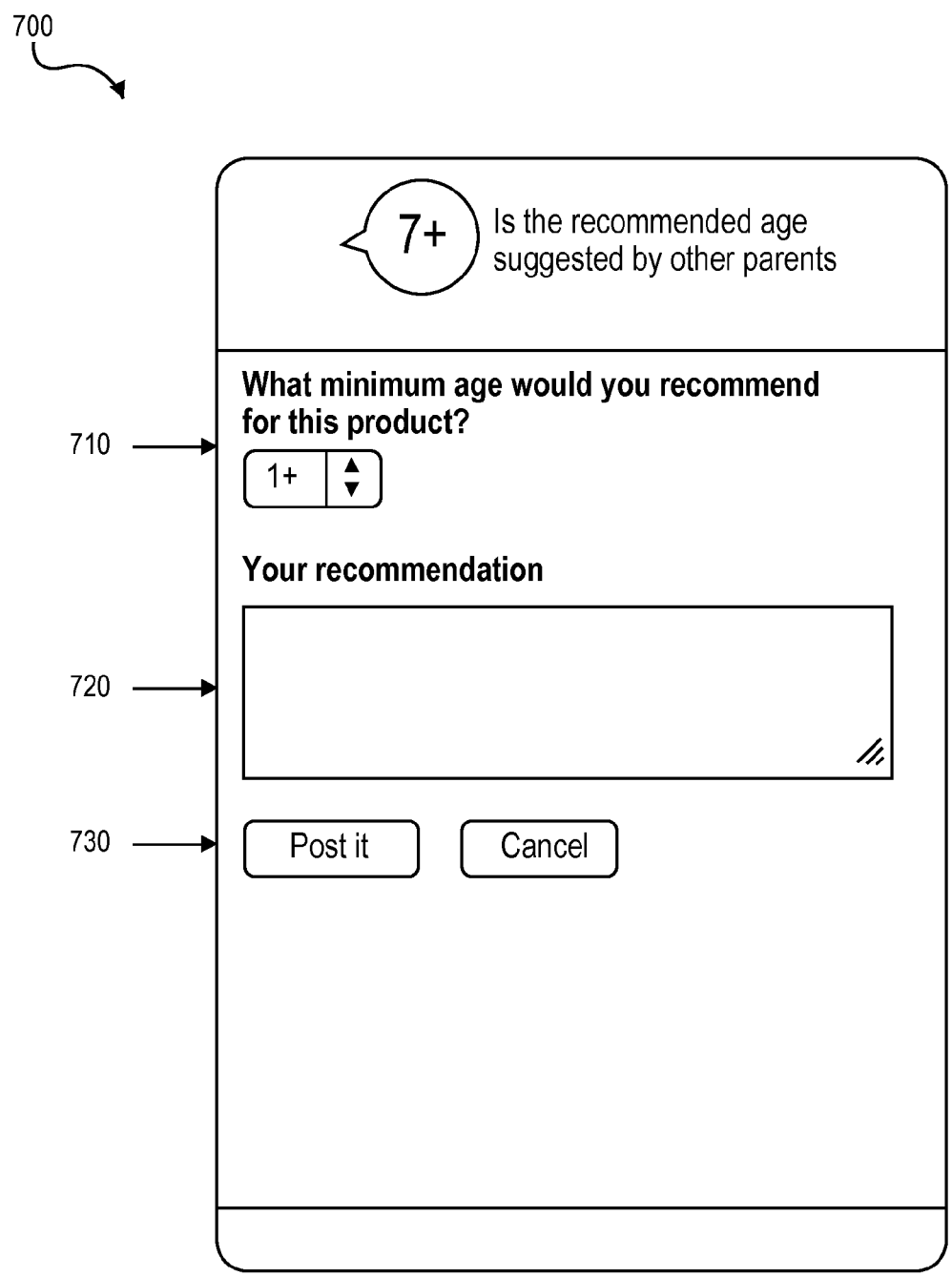
FIG. 7 is a screenshot depicting an embodiment a feedback widget to receive user feedback to provide directly to a user's social network.

This is correlated to block 530 of FIG. 5, where a survey is displayed in the UI widget that requests a user's feedback on the content item. FIG. 7 is a screenshot depicting one embodiment a feedback widget 700 to receive user feedback to provide directly to a user's social network. In one embodiment feedback widget 700 is generated when the feedback button 640 described in FIG. 6 is selected. As discussed above, any social network provider may be integrated with feedback widget 700. In one embodiment, feedback widget 700 includes a feedback survey question 710 directed to a particular feedback-type (in this case, age-based review). In addition, feedback widget may include a text entry box 720 to allow users to input free text related his/her opinion of the content item.

The user may then select a commit button 730 to submit the feedback survey information to a social network of the user. In one embodiment, this feedback survey information is automatically populated with a unique hashtag associated with the content provider and a product ID number of the content item, which will both appear with the user-inputted survey information on the user's profile page on the social network provider. In one embodiment, the feedback survey information is then part of the social network data that is polled and/or monitored by the customizable feedback module and eventually integrated as part of the aggregated feedback score for the content item.

Referring back to FIG. 5, at block 540, the received feedback via the survey UI is caused to be transmitted to the social network provider. In one embodiment, this transmission is part of an API from the social network provider to the content provider that ties the social network provider platform into the web platform of the content provider.

Figure 8:
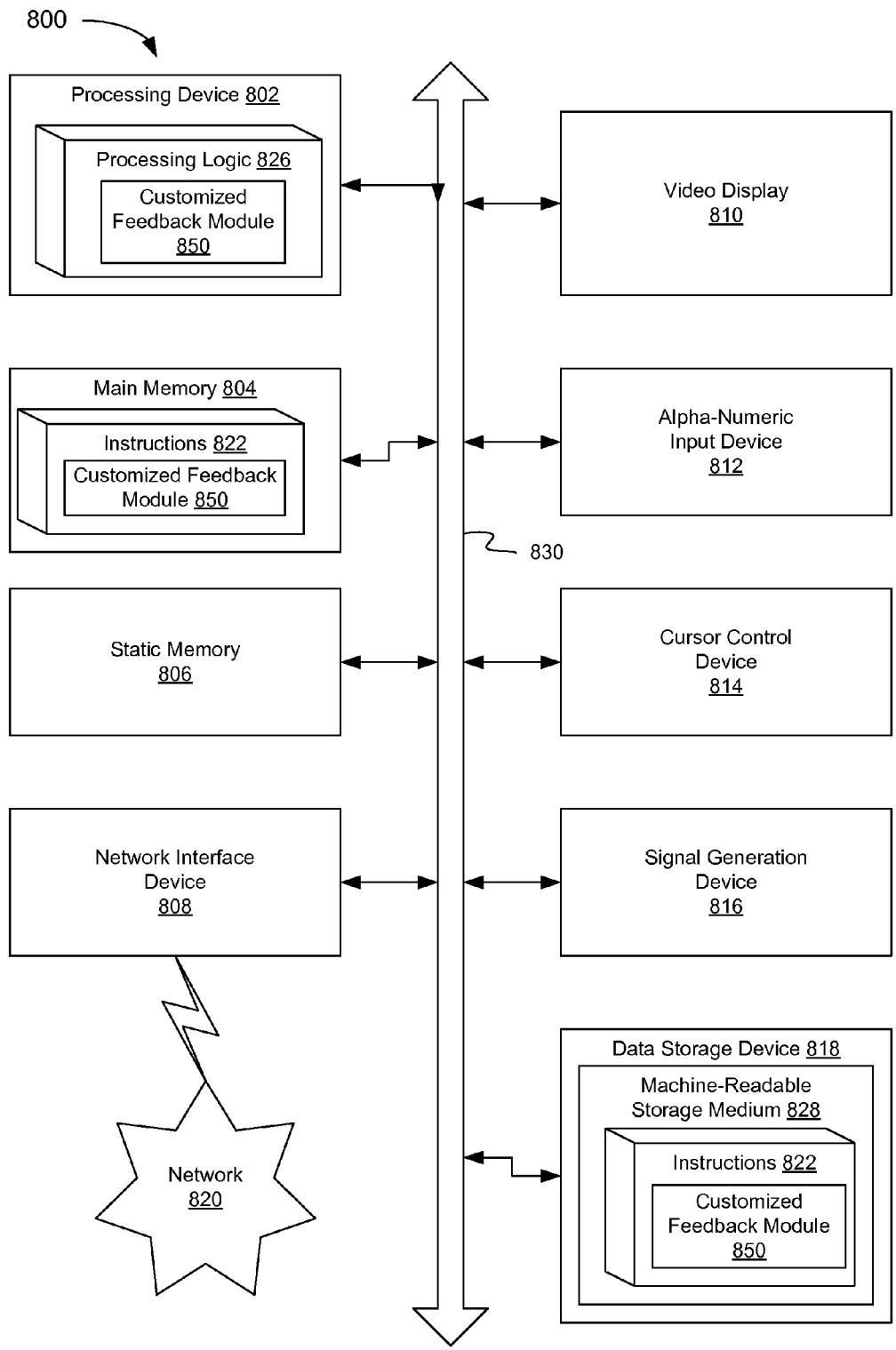
FIG. 8 is a block diagram illustrating one embodiment of a computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing system (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute a customized feedback module 850, such as customized feedback module 127 of FIG. 1, for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of customized feedback module 850, which is the same as customized feedback module 127) embodying any one or more of the methodologies or functions described herein. The instructions 822 may also reside, completely or at least partially, within the main memory 804 and/or within processing logic 826 of the processor 802 during execution thereof by the computer system 800, the main memory 804 and the processor 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting", "receiving", "parsing", "mining", "generating", "presenting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   requesting, by a processing device, a social network provider to extract a plurality of social network data entries comprising data submitted via a social network service of the social network provider;
   parsing the plurality of social network data entries to identify one or more of the social network data entries that are related to a content item;
   searching the one or more of the social network data entries to identify feedback information regarding the content item;
   adding the feedback information regarding the content item as a record in a feedback table;
   receiving a user request to view feedback information regarding the content item from members of a social circle of the user;
   generating a feedback result regarding the content item from a record associated with a member of the social circle of the user; and
   generating a product details web page associated with the content item, wherein the product details web page comprises the feedback result and enables the user to purchase the content item.

2. The method of claim 1, wherein sending the feedback result further comprises:
   preparing a file described in a markup language, the file comprising the feedback result in a graphical user interface (GUI), wherein the file is rendered on the product details web page of the content item.

3. The method of claim 1, wherein parsing the social network data entries further comprises:
   searching the social network data entries for at least one of a product identification number of the content item or a product title of the content item.

4. The method of claim 1, further comprising:
   searching the social network data entries for a hashtag associated with a provider of the content item.

5. The method of claim 1, wherein requesting the social network provider to extract the plurality of social network data entries from the social network provider further comprises:
   using a streaming application programming interface (API) to access the social network provider in order to receive the plurality of social network data entries, wherein the streaming API implements a continuous connection to the social network provider to maintain a state of communications from the social network provider.

6. The method of claim 1, wherein the feedback information is one of a review indicating a suggested age for the content item, a review indicating a category type of the content item based on violence or profanity, a review indicating a trend that the content item follows, a review indicating a situation that is typical for a user of the content item, or a review indicating one or more products that the content item is compatible with.

7. A system comprising:
   a memory to store a plurality of social network data entries; and
   a processing device communicably coupled to the memory, the processing device to:
   request a social network provider to extract the plurality of social network data entries from the at least one social network provider, wherein the plurality of social network data entries comprise data submitted via a social network service;
   identify one or more social network data entries extracted from the at least one social network provider that are related to a content item;
   parse the identified one or more social network data entries to identify feedback information regarding the content item;
   receive a user request for feedback information regarding the content item from members of a social circle of the user;
   generate a feedback result based on the feedback information in the one or more social network data entries; and
   generate a product details web page associated with the content item, wherein the product details web page comprises sending the feedback result to the user and enables the user to purchase the content item.

8. The system of claim 7, wherein the one or more social network data entries are received via a streaming application programming interface (API) of the at least one social network provider, wherein the streaming API implements a continuous connection to the social network provider to maintain a state of communications from the social network provider.

9. The system of claim 7, the processing device to:
access a feedback table that stores records detailing the feedback;
for the records in the feedback table associated with the content item, identify a subset of the records comprising feedback having a first type; and
perform an operation on the subset of records, the operation to generate a single feedback result that summarizes the feedback in the subset of records.

10. The system of claim 9, wherein the feedback information is one of a review indicating a suggested age for the content item, a review indicating a category type of the content item based on violence or profanity, a review indicating a trend that the content item follows, a review indicating a situation that is typical for a user of the content item, or a review indicating one or more products that the content item is compatible with.

11. The system of claim 9, wherein the operation comprises an average of values of the feedback in the subset of records.

12. The system of claim 9, wherein the operation comprises determining a value that comprises a pre-determined percentage of the feedback in the subset of records.

13. The system of claim 9, wherein the subset of records is further identified based on feedback from social network data entries associated with the members of the social circle of the user in a social network of the at least one social network provider.

14. The system of claim 7, wherein the processing device to:
generate a graphical user interface (GUI) comprising the feedback result; and
prepare a file described in a markup language, the file comprising the GUI, wherein the file is rendered on a product details web page of the content item.

15. A non-transitory computer-readable storage medium storing instructions which, when executed, cause a processing device to:
request a social network provider to extract one or more social network data entries from at least one social network provider, wherein the plurality of social network data entries comprise data submitted via at least one social network service;
identify one or more social network data entries extracted from the at least one social network provider that are related to a content item;
parse the identified one or more social network data entries to feedback information regarding the content item;
receive a user request for feedback information regarding the content item from members of a social circle of the user;
generate, by the processing device, a feedback result based on the feedback information in the one or more social network data entries; and
generate a product details web page associated with the content item, wherein the product details web page comprises sending the feedback result to the user and enables the user to purchase the content item.

16. The non-transitory computer-readable storage medium of claim 15, wherein the one or more social network data entries are received via a streaming application programming interface (API) of the at least one social network provider, wherein the streaming API implements a continuous connection to the social network provider to maintain a state of communications from the social network provider.

17. The non-transitory computer-readable storage medium of claim 15, the processing device to:
access a feedback table that stores records detailing the feedback;
for the records in the feedback table associated with the content item, identify a subset of the records comprising feedback having a first type; and
perform an operation on the subset of records, the operation to generate a single feedback result that summarizes the feedback in the subset of records.

18. The non-transitory computer-readable storage medium of claim 17, wherein the feedback information is one of a review indicating a suggested age for the content item, a review indicating a category type of the content item based on violence or profanity, a review indicating a trend that the content item follows, a review indicating a situation that is typical for a user of the content item, or a review indicating one or more products that the content item is compatible with.

19. The non-transitory computer-readable storage medium of claim 17, wherein the subset of records is further identified based on feedback from social network data entries associated with members of a social circle of a user in a social network of the at least one social network provider.

20. The non-transitory computer-readable storage medium of claim 15, the processing device to:
generate a graphical user interface (GUI) comprising the feedback result; and
prepare a file described in a markup language, the file comprising the GUI, wherein the file is rendered on the product details web page of the content item.

* * * * *